W. C. BAKER.
BRAKE.
APPLICATION FILED APR. 10, 1919.
1,385,420.
Patented July 26, 1921.
2 SHEETS—SHEET 1.
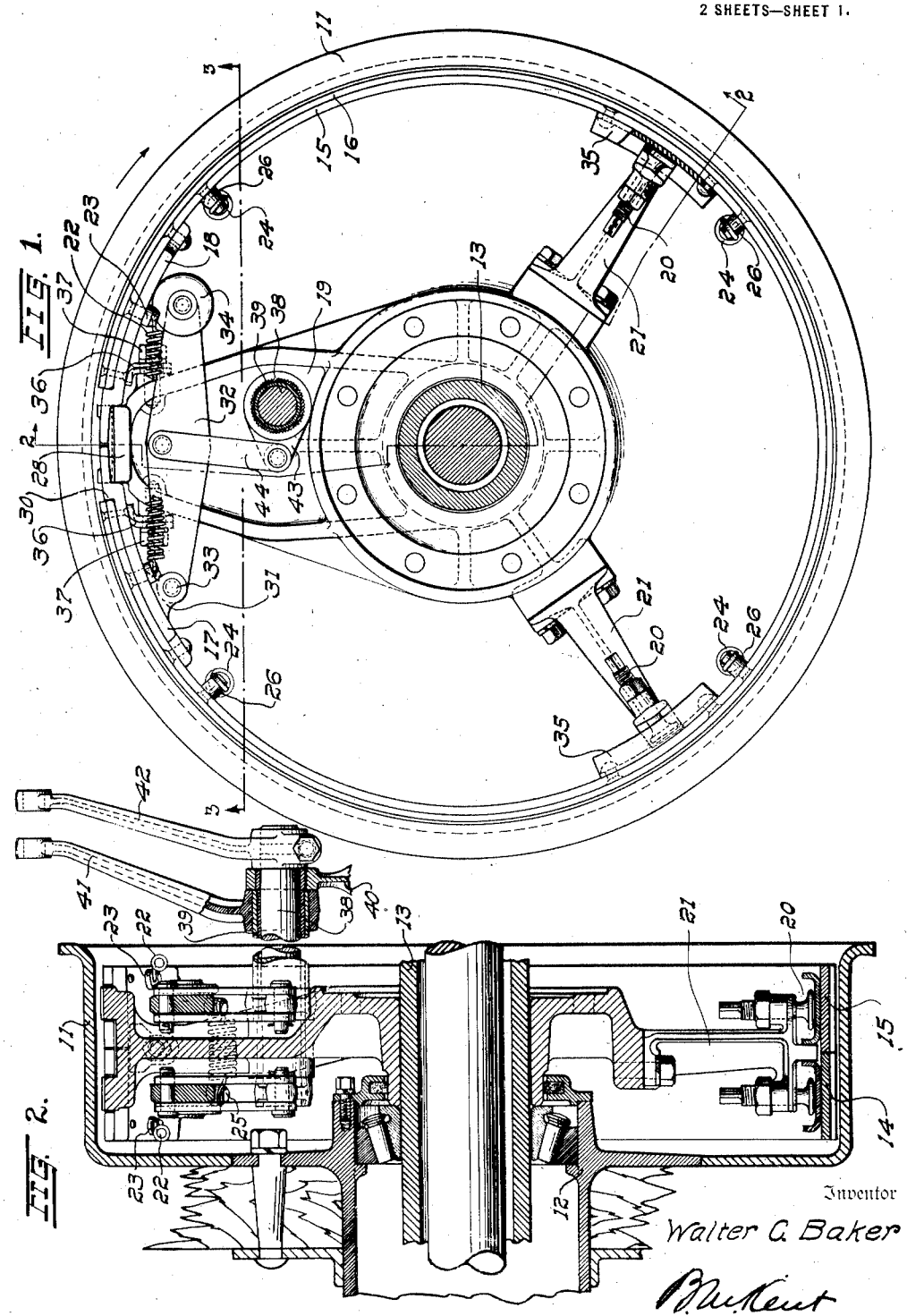
Inventor
Walter C. Baker
B. M. Kent
Attorney W. C. BAKER.
BRAKE.
APPLICATION FILED APR. 10, 1919.
1,385,420.
Patented July 26, 1921.
2 SHEETS—SHEET 2.
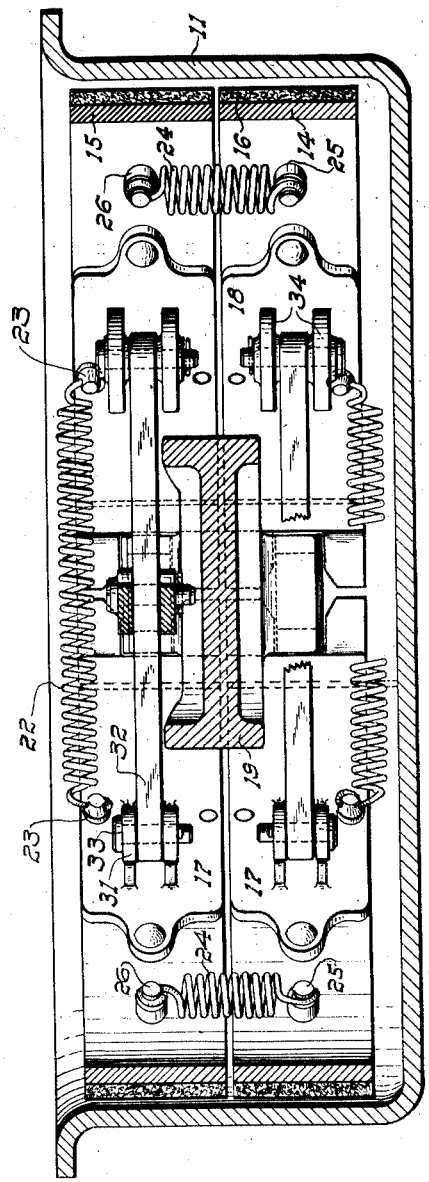
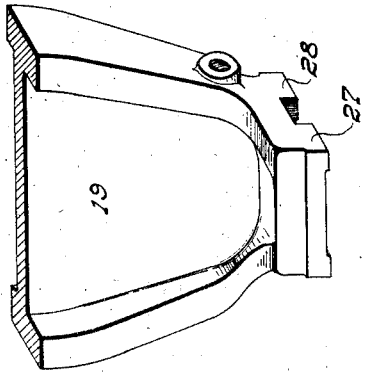
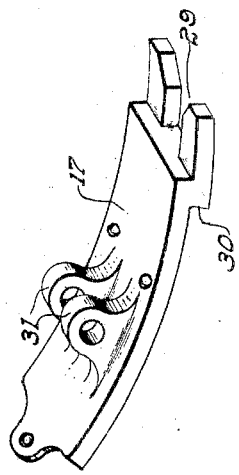
Inventor
Walter C. Baker
By
Attorney

UNITED STATES PATENT OFFICE.

WALTER C. BAKER, OF CLEVELAND, OHIO, ASSIGNOR TO THE STANDARD PARTS COMPANY, OF CLEVELAND, OHIO, A CORPORATION OF OHIO.

BRAKE.

1,385,420.      Specification of Letters Patent.      Patented July 26, 1921.

Application filed April 10, 1919. Serial No. 289,059.

*To all whom it may concern:*

Be it known that I, WALTER C. BAKER, a citizen of the United States, and a resident of Cleveland, county of Cuyahoga, State of Ohio, have invented certain new and useful Improvements in Brakes, of which the following is a specification.

This invention relates to brake mechanism for motor vehicles and more particularly to what is known as the self-acting brake, in which a flexible band is applied to the brake drum by radial pressure applied to one or both ends of the band, the friction due to the radial pressure causing the band to tend to travel with the drum and thus build up the braking force.

One of the objects of the invention is to provide a brake mechanism of the class described, in which the parts are so arranged that when the brake is applied, the braking effort will be in proportion to the applying force, without resulting in substantial movement of the actuating pedal or lever.

A further object of the invention is to provide a brake of the class described, in which the wear of the lining will not result in undue lost motion of the brake operating pedal or lever. A further object is to provide improved anti-rattling means for a pair of brakes arranged side by side.

Other objects and features of novelty will be apparent from the following description, taken in connection with the accompanying drawing, in which:

Figure 1 is a side elevation of a brake drum and operating mechanism embodying my invention;

Fig. 2 is a section on line 2—2 of Fig. 1;

Fig. 3 is a horizontal section on line 3—3 of Fig. 1; and

Figs. 4 and 5 are detail views, in perspective, of parts of the anchoring structure.

In the drawings, I have illustrated a brake drum 11 which may be secured to a vehicle wheel in the usual manner, the hub of the wheel being indicated at 12 and rotatably mounted on the axle housing 13. Within the drum 11, I have shown two independently operable brakes 14 and 15, arranged side by side and in all respects similar to each other, so that a description of one of these brakes and its actuating mechanism will suffice for both. The brakes 14 and 15 are preferably formed of flexible bands provided with the usual lining 16, of friction material, and further provided with end members 17 and 18, which coöperate with abutments on the anchor bracket 19, which is secured on the axle housing 13. Each of the brakes is also supported by means of adjustable members 20 carried by brackets 21, which are secured to the hub of the bracket 19 and springs 22 are attached to the free ends of the brake band by means of lugs 23, normally to hold the brakes inwardly against these adjustable members. For the purpose of preventing rattling, a plurality of springs 24 are provided at intervals around the brake bands, and in the drawings, I have illustrated four of these springs which have their ends connected with studs 25 and 26, the studs 25 being on the brake band 14 and the studs 26 on the band 15. The springs 24 draw the edges of the band together and hold them so as to prevent rattling.

The anchor bracket 19 is provided at its end with abutments 27 and 28, each of which coöperates with one of the brake bands 14 and 15, and each end member 17 is forked, as indicated at 29, to receive one end of one of the abutments, the corresponding end member 18 being similarly forked to receive the other end of said abutment. The end members 17 and 18 are riveted to the ends of the brake band and each is provided with a shoulder 30 against which the end of the band abuts, so that the rivets will be relieved of shearing stress. The end member 17 is provided with a pair of inwardly projecting ears 31 to which an equalizing lever 32 is pivoted by means of the pin 33. The opposite end of the lever 32 is arranged to coöperate with the end member 18 for the purpose of moving the latter radially against the interior of the brake drum. The coöperation of the lever 32 with the member 18 is preferably through one or more rollers 34 for the purpose of permitting relative circumferential movement of the parts, without undue friction, and in the drawings, I have shown two rollers 34 carried by the lever 32 and arranged to roll on the inner surface of the member 18. Where the brake band is engaged by the adjustable members 20, it is provided with channeled wear plates 35, which engage with extensions on the brackets 21 to limit lateral motion of the brake band, and stops 36 are fitted on the anchor bracket 19 by means of screws 37, so as to engage end members 17 and 18 and assist in holding the brake close to its operative position.

The brake operating mechanism comprises concentric shafts 38 and 39, journaled in the anchor bracket 19 and a bracket 40 which may be fixed on the axle housing 13, and carrying at their outer ends the lever arms 41 and 42 whereby the shafts may be rotated by any usual form of brake operating means. Each of these shafts is provided with a lever arm 43 connected by a link 44 to the equalizing bar or lever 32. It will be noted that, as illustrated in Fig. 1, the link 44 is not exactly perpendicular to the member 32, so that the member 32 may move slightly with the end member 17 to allow for the expansion of the brake band, and the link 44 and member 32 will remain substantially perpendicular at all times.

When the brake operating pedal or lever is moved to rotate the shaft 38 or 39, the link 44 is moved to exert a thrust against the lever or equalizing bar 32. As the link is connected to the member 32 at its center, the forces exerted on the end members 17 and 18 and moving the free ends of the brake band against the drum will be equal. A relatively short movement of the operating mechanism will cause such engagement of both ends of the brake band with the drum, and no further movement of the brake pedal or lever will be possible except that permitted by the resiliency of the parts.

If the drum is rotating in the direction of the arrow shown on Fig 1 and the brake is applied, that end of the brake band to which the member 18 is attached will move slightly with the drum, the member 18 moving upon the rollers 34. The member 17 and the other end of the brake band will be moved outwardly, but circumferential motion with the drum will be impossible because of the engagement of the member 17 with the anchor abutment. If the drum is rotating in the opposite direction, the end member 17 will move slightly with the drum and the lever 32 will move with it, the rollers 34 rolling over the surface of end member 18, which, in turn, will be anchored by the abutment.

In either direction of rotation of the drum, it will be seen that the motion of the operating mechanism necessary to apply the brakes is small, that no further motion is necessary to maintain the brakes in applied position, and that, as the brake lining becomes worn and the amount of movement of the free end of the brake band necessary to expand it against the drum becomes greater, no corresponding increase in the movement of the brake operating mechanism is needed. Because of the slight motion necessary to apply the brake and maintain its maximum braking effort, it will be seen that great leverage may be provided by a brake pedal or lever moving through a limited distance, and the motion of such operating means will not materially increase as the parts become worn.

Having thus described my invention, what I claim is:

1. In brake mechanism, the combination of a brake drum, a brake band, members rigidly secured to the ends of the brake band, anchoring means coöperating with said members to limit the circumferential movement of the brake band, and operating means for moving the ends of the brake band toward the drum comprising a member movable with the member on one end of the brake band and coöperating with the member on the other end of the brake band.

2. In brake mechanism, the combination of a brake drum, a brake band, members rigidly secured to the ends of the brake band, anchoring means coöperating with said members to limit the circumferential movement of the brake band, and operating means for moving the ends of the brake band toward the drum comprising a lever pivotally connected to the member on one end of the brake band and adapted to coöperate with the member on the other end of the brake band.

3. In brake mechanism, the combination of a brake drum, a brake band, operating means for engaging said brake band with the drum, and an anchoring member, the end of the brake band being forked and engaging said anchoring member, whereby it is held from circumferential movement and from lateral movement relative to said member.

4. In brake mechanism, the combination of a brake drum, a pair of brake members adapted to be engaged with said drum and arranged side by side, operating means for engaging said members with the drum and circumferentially spaced resilient means for holding said members together laterally.

5. In brake mechanism, the combination of a brake drum, a pair of brake members adapted to be engaged with said drum and arranged side by side, operating means for engaging said members with the drum and a plurality of circumferentially spaced springs engaging said members to resiliently hold them together laterally.

6. In brake mechanism, the combination of a brake drum, a pair of brake members, operating means for engaging said members with said drum, anchoring means to hold said members against circumferential movement, and resilient means connected to both of said members to hold them laterally toward each other, said members having parts thereof engaging said anchoring means to limit their lateral movement.

7. In brake mechanism, the combination of a brake drum, a pair of substantially circular brake bands arranged side by side, operating means for engaging said brake bands with the drum, anchoring means limiting the movement of the brake bands, and a spring engaging both of said brake bands and holding them together laterally.

In testimony whereof I affix my signature.

WALTER C. BAKER.